US010523856B2

(12) United States Patent
Shukla et al.

(10) Patent No.: US 10,523,856 B2
(45) Date of Patent: Dec. 31, 2019

(54) METHOD AND ELECTRONIC DEVICE FOR PRODUCING COMPOSITE IMAGE

(71) Applicant: Samsung Electronics Co., Ltd., Suwon-si, Gyeonggi-do (KR)

(72) Inventors: Alok Shankarlal Shukla, Bangalore (IN); Prajit Sivasankaran Nair, Bangalore (IN); Lokesh Rayasandra Boregowda, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/696,733

(22) Filed: Sep. 6, 2017

(65) Prior Publication Data

US 2018/0069996 A1 Mar. 8, 2018

(30) Foreign Application Priority Data

Sep. 8, 2016 (IN) .............................. 201641030727
May 3, 2017 (IN) ............................. 2016-41030727

(51) Int. Cl.
| | |
|---|---|
| H04N 5/225 | (2006.01) |
| H04N 5/232 | (2006.01) |
| H04N 5/235 | (2006.01) |
| H04N 5/33 | (2006.01) |
| H04N 9/64 | (2006.01) |

(52) U.S. Cl.
CPC ......... *H04N 5/2258* (2013.01); *H04N 5/2351* (2013.01); *H04N 5/23232* (2013.01); *H04N 5/332* (2013.01); *H04N 9/646* (2013.01)

(58) Field of Classification Search
CPC .. H04N 5/2258; H04N 9/07; H04N 2209/047; H04N 5/33; H04N 5/2351; H04N 5/265; H04N 5/23293; H04N 5/262; H04N 5/04; H04N 5/232; G06K 9/00288
See application file for complete search history.

(56) References Cited

U.S. PATENT DOCUMENTS

| | | | |
|---|---|---|---|
| 5,555,324 A * | 9/1996 | Waxman ................... | G06T 5/20 |
| | | | 348/E5.09 |
| 2007/0228259 A1* | 10/2007 | Hohenberger .......... | H01J 31/50 |
| | | | 250/214 LA |

(Continued)

FOREIGN PATENT DOCUMENTS

| | | |
|---|---|---|
| EP | 2 309 449 A1 | 4/2011 |
| KR | 10-2010-0084835 A | 7/2010 |

OTHER PUBLICATIONS

International Search Report dated Dec. 11, 2017, issued in the International Application No. PCT/KR2017-009843.

(Continued)

*Primary Examiner* — Dramos Kalapodas
(74) *Attorney, Agent, or Firm* — Jefferson IP Law, LLP

(57) ABSTRACT

A method and an electronic device for producing a composite image are provided. The method includes receiving visible image data and near infrared (NIR) image data from a composite sensor, determining whether at least one portion of the NIR image data having a level of detail greater than or equal to a threshold, and generating a composite image by fusing the visible image data with the at least one portion of the NIR image data based on the determination and storing the composite image in a memory.

20 Claims, 10 Drawing Sheets

(56) References Cited

U.S. PATENT DOCUMENTS

| | | | |
|---|---|---|---|
| 2009/0002475 A1* | 1/2009 | Jelley | H04N 5/2256 |
| | | | 348/14.01 |
| 2010/0124373 A1* | 5/2010 | Yoo | H04N 5/217 |
| | | | 382/167 |
| 2010/0309315 A1 | 12/2010 | Hogasten et al. | |
| 2013/0286236 A1* | 10/2013 | Mankowski | H04N 5/23222 |
| | | | 348/222.1 |
| 2014/0218538 A1* | 8/2014 | Choi | H04N 5/332 |
| | | | 348/164 |
| 2017/0078591 A1* | 3/2017 | Petrov | H04N 5/332 |

OTHER PUBLICATIONS

Shibata Takashi et al: "Visible and near-infrared image fusion based on visually salient area selection", Visual Communications and Image Processing; Jan. 20, 2004-Jan. 20, 2004; San Jose, vol. 9404, Feb. 27, 2015 (Feb. 27, 2015), pp. 94040G-94040G, XP060046444.
Extended European Search Report dated Jul. 16, 2019, issued in European Application No. 17849115.5.

* cited by examiner

Visible Image

NIR Image

Weighted Mask Image

Detail Image form NIR

Visible image in
hazy weather condition

NIR image in
hazy weather condition

Composite image with wavelength
beyond
visible wavelength

Visible image

NIR image

Composite image with
improved range

Visible image        NIR image

Composite image with improved level
of realistic skin smoothing

METHOD AND ELECTRONIC DEVICE FOR PRODUCING COMPOSITE IMAGE

CROSS-REFERENCE TO RELATED APPLICATION(S)

This application claims the benefit under 35 U.S.C. § 119(a) of an Indian patent application filed on Sep. 8, 2016 in the Indian Patent Office and assigned Serial number 201641030727, and of an Indian patent application filed on May 3, 2017 in the Indian Patent Office and assigned Serial number 201641030727, the entire disclosure of each of which is hereby incorporated by reference.

TECHNICAL FIELD

The present disclosure relates to a method and an electronic device for producing a composite image.

BACKGROUND

Enhancement of low light images has drawn much attention in the field of computational photography. Images captured under low light conditions are underexposed, suffer from noise and color cast, and lack fine features. In order to obtain high sensitivity under low light conditions, a high ISO setting is required, which leads to a large amount of noise in the captured images. Another approach to tackle this problem is to use an external light source (e.g., a flash) when capturing the images. However, as the color temperature and the intensity of a flash differ from those of the ambient atmosphere, use of a flash may result in unnatural artifacts such as red eye, harsh shadows, etc.

Several methods for enhancing images exist which involve capturing corresponding near infrared (NIR) images and transferring the details and contrast of the NIR images based on a mask obtained from the saturation and luminance channels of a visible image (i.e., visual image). However, this method fails under low light conditions. Another method of enhancing low light images includes using NIR images captured with a flash. Such methods completely depend on noise-free and high contrast NIR images captured from a dual camera system by removing an IR cut filter (IR cutoff filter).

Visible images have a natural look comfortably viewable by users using the human eye. NIR images, though effective in displaying the temperature (e.g. heat) of objects (such as humans, cars, or fires), do not look natural. As described, an image capturing device may utilize one or more sensors operating in two different wavelength regions: visible wavelength region (e.g., red, green, and blue (RGB)) and the NIR wavelength regions in order to maximize quality of the captured image during processing.

Although various methods for combining, fusing, the visible image details and the NIR image details exist, such methods apply fusion techniques to the entirety of the images. There exists several situations where fusing a large amount of the details of the NIR image with the visible image may result in an undesired combined image.

The above information is presented as background information only to assist with an understanding of the present disclosure. No determination has made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mechanism for producing a composite image.

Another aspect of the present disclosure is to provide a mechanism for receiving, by a processor, visible image data and near infrared (NIR) image data from a composite sensor.

Another aspect of the present disclosure is to provide a mechanism for identifying and/or determining, by the processor, at least one portion of the NIR image data having a level of detail greater than or equal to a threshold.

Another aspect of the present disclosure is to provide a mechanism for generating, by the processor, a composite image by fusing the visible image data with the at least one portion of the NIR image data and storing, by the processor, the composite image in storage or memory.

Another aspect of the present disclosure is to provide a mechanism to evaluate the proposed composite sensor to obtain an enhanced image without any artifacts.

In accordance with an aspect of the present disclosure, a method for producing a composite image by an electronic device is provided. The method includes receiving, by a processor, visible image data and NIR image data from a composite sensor, identifying, by the processor, at least one portion of the NIR image data having a level of detail greater than or equal to a threshold, generating, by the processor, a composite image by fusing the visible image data with the at least one portion of the NIR image data and storing, by the processor, the composite image in a memory.

The level of detail includes at least one of noise reduction NIR image data, contrast adjustment of the visible image data, normalization of the visible image data, normalization of the NIR image data, high frequency components of the NIR image, high texture components of the NIR image, or a decomposition of the visible image, or a decomposition of the NIR image.

The fusing of the visible image data with the at least one portion of the NIR image data includes detecting a contextual event, identifying the at least one portion of the NIR image data based on the contextual event, and transferring a detail layer of the at least one portion of the NIR image to a base layer of the visible image.

In an embodiment, the contextual event may be one of a lighting condition, or a weather condition.

In an embodiment, the transferring of the detail layer includes transferring, to the base layer of the visible image, the level of detail of the at least one portion of the NIR image data based on a weight mask obtained from a saturation and luminance channels of the visible image.

In an embodiment, the fusing of the visible image data with the at least one portion of the NIR image data includes selecting an amount of the at least one portion of the NIR image data to fuse with the visible image, based on the level of detail of the at least one portion of the NIR image data, and fusing the visible image data with the at least one portion of the NIR image data, based on the selected amount.

In an embodiment, the composite image includes at least one of an improved level of realistic skin smoothing compared to the visible image, an improved level of range compared to the visible image, an improved level of visibility compared to the visible image, or an improved level of rich information outside a visible wavelength compared to the visible image.

In accordance with another aspect of the present disclosure, an electronic device for producing a composite image is provided. The electronic device includes a memory, a composite sensor capable of capturing a visible image and NIR image, a processor, coupled to the memory and the composite sensor, configured to receive visible image data associated with the visible image and NIR image data associated with the NIR image from the composite sensor, identify and/or determine at least one portion of the NIR image data having a level of detail greater than or equal to a threshold, generate the composite image with the visible image based on the identification or the determination and store the composite image in the memory.

In an embodiment, the processor is configured to generate the composite image by fusing the visible image data with the at least one portion of the NIR image data based on the determination that the at least one portion of the NIR image data has a level of detail greater than or equal to the threshold.

Other aspects, advantages, and salient features of the disclosure will be become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantage of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
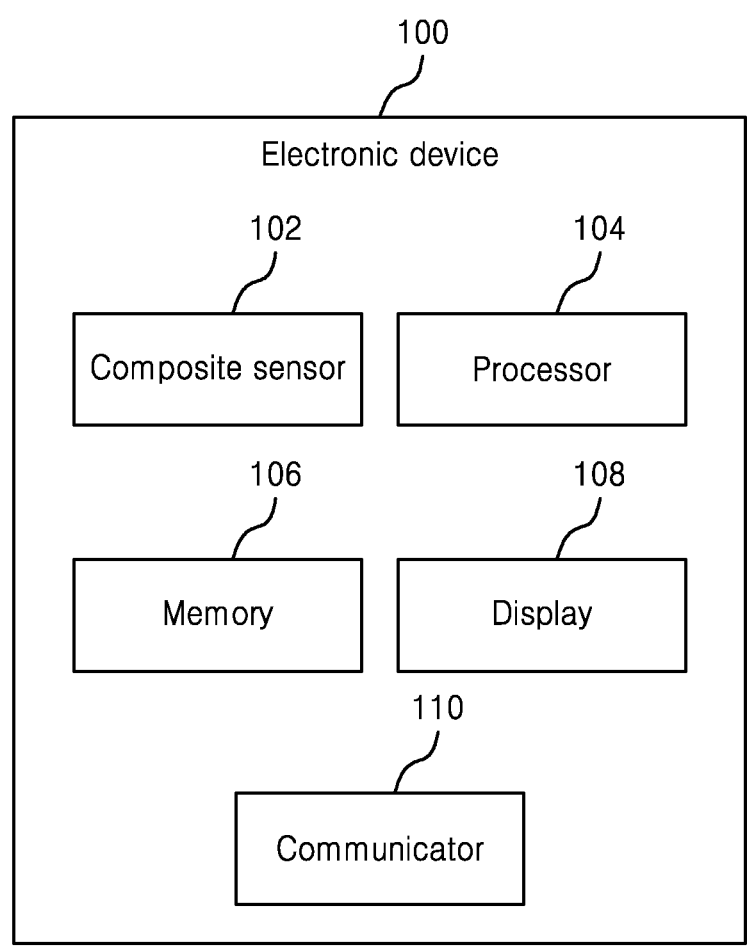
FIG. 1 illustrates various units of an electronic device for producing a composite image according to an embodiment of the present disclosure

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments.

Herein, the term "or" as used herein, refers to a non-exclusive "or", unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

In accordance with an embodiment of the present disclosure, a method is provided for producing a composite image by an electronic device. The method includes receiving visible image data and near infrared (NIR) image data from a composite sensor, identifying at least one portion of the NIR image data having a level of detail greater than or equal to a threshold, generating a composite image by fusing the visible image data with the at least one portion of the NIR image data, and storing the composite image in a memory.

In accordance with an embodiment of the present disclosure, an electronic device is configured to produce a composite image. The electronic device includes: a memory, a composite sensor capable of capturing a visible image and NIR image, a processor, coupled to the memory and the composite sensor, configured to: receive visible image data associated with the visible image and NIR image data associated with the NIR image from the composite sensor, identify and/or determine whether at least one portion of the NIR image data having a level of detail greater than or equal to a threshold, generate the composite image by fusing the visible image data with the at least one portion of the NIR image data if the at least one portion of the NIR image data has a level of detail greater than or equal to a threshold and store the composite image in the memory.

In a mechanism of the related art, an infrared (IR) filter mounted between the lens and the NIR sensor(s) of an electronic device (i.e., mobile phone, camera) minimizes interference with the NIR sensor(s). However, NIR waves, which have a wavelength of 700-1100 nm, can travel through haze & fog and better penetrate human skin, thus serving to automatically smoothen skin tone of a subject in a captured image. The visible spectrum wavelength can facilitate the user with images which contain desired color information and are visible by the user. However, under low light conditions, visible images obtained through visible image sensor imaging (i.e., visible light-wavelengths of 400-700 nm) may be distorted, and is may be difficult to obtain imperative details in the images.

Further, the international commission on illumination (CIE) standard utilizes a D65 light source (standard daylight), which does not contain NIR content. For NIR images captured with a composite red, green, and blue (RGB)-IR image sensor under D65 light, no extra information is present, only noise. A light source, on the other hand, contains good amount of NIR content. The fusion of visible (e.g., RGB) and NIR images will improve the quality of a composite RGB-IR image in the case of a light source. However, with D65 light it will have little impact on or may degrade the quality of the NIR image due to sensor noise. Generating composite images by blindly fusing visible (e.g., RGB) and NIR images may result in degraded quality. Thus, combining or not combining visible (e.g., RGB) and NIR images depends on the NIR content in the light source (i.e., NIR image quality).

Unlike the mechanism of the related art, according to the proposed mechanism, a user may differentiate details from noise in NIR images obtained from a composite RGB-IR image sensor which can be called as a composite sensor alternately in this disclosure.

Unlike the mechanism of the related art, the proposed mechanisms increase the contrast of visible images and normalization of NIR images, as the obtained NIR images (i.e., images obtained under low light conditions) lack significant contrast therein.

Unlike the mechanism of the related art, the proposed mechanisms perform seamless fusion of visual and NIR images.

Referring now to the drawings, and more particularly to FIGS. 1, 2, 3A and 3B, 4, 5A to 5C, 6A to 6C, 7, 8, 9A and 9B, and 10, where similar reference characters denote corresponding features consistently throughout figures, there are shown preferred embodiments.

FIG. 1 illustrates various units of an electronic device 100 for producing a composite image according to an embodiment of the present disclosure.

Referring to FIG. 1, the electronic device 100 may be, for example, a camera, a digital camera, an image capturing device, a mobile device, a wearable device, a laptop computer, a desktop computer, a smart television, a smart display, a notebook computer, a notebook, a tablet or a mobile device such as a mobile phone, or any consumer electronic device. Other forms of data processing devices are within the scope of the various embodiments discussed herein.

The electronic device 100 includes a composite sensor 102, a processor 104 (for example, a hardware unit, an apparatus, a central processing unit (CPU), or a graphics processing unit (GPU)), memory 106 (e.g., a volatile memory and/or a non-volatile memory), a display 108 (e.g., a cathode ray tube (CRT) display, a liquid crystal display (LCD), a light-emitting diode (LED)), and a communicator 110.

The memory 106 includes storage locations accessible via the processor 104. The electronic device 100 may interface with the display 108 via the processor 104, and the display 108 may be integrated with the electronic device 100 or communicatively coupled thereto. The processor 104 may be communicatively coupled to the memory 106. Further, the processor 104 is configured to generate an enhanced image (e.g., a visible image and an NIR image captured by the composite sensor 102) and display the same on the display 108.

The composite sensor 102 may include a RGB sensor for capturing visible images (e.g., RGB images) and an NIR sensor for capturing NIR images.

The processor 104 may separate visible images (e.g., RGB images) and NIR images received from the composite sensor 102. The processor 104 may determine whether any portions of an NIR image (e.g., any portions of data of the NIR image) have a level of detail greater than or equal to a threshold. For example, the processor 104 may identify a portion(s) of the NIR image having a level of detail greater than or equal to the threshold. The detail may be, for example, high frequency components of the NIR image, high texture components of the NIR image, or contrast of the NIR image obtained by a contrast adjuster (to be described in greater detail below). The threshold may be configured by the processor 104 but is not limited thereto. For example, the threshold may be preset or adjustable by the processor 104, a user, or a manufacturer. The processor 104 may generate a composite image (e.g., visible image+NIR image) by fusing visible image data (e.g., RGB image data) with the identified portion(s) of the NIR image data, thereby producing an enhanced image if the portion(s) of the NIR image have a level of detail greater than or equal to the threshold.

The composite image may be rendered on the display 108 and stored on the memory 106.

Unlike the mechanism of the related art, according to the proposed method, the processor 104 may analyze the availability of additional visual details in the NIR image data and intelligently perform fusion of the visible image data with one or more portions of the NIR image data having the additional visual details, thereby obtaining an enhanced image (i.e., composite image).

The electronic device 100 of the present disclosure is not limited to the units (i.e., components, devices, or elements) illustrated in FIG. 1. For example, the number of units included in the electronic device 100 may differ according to embodiment. Additionally, the labels and/or names of the units of the electronic device 100 are provided only for illustrative purposes and do not limit the scope of the embodiment. For example, the electronic device 100 and the functionality thereof may be implemented by a single unit or a combination of units.

Figure 2:
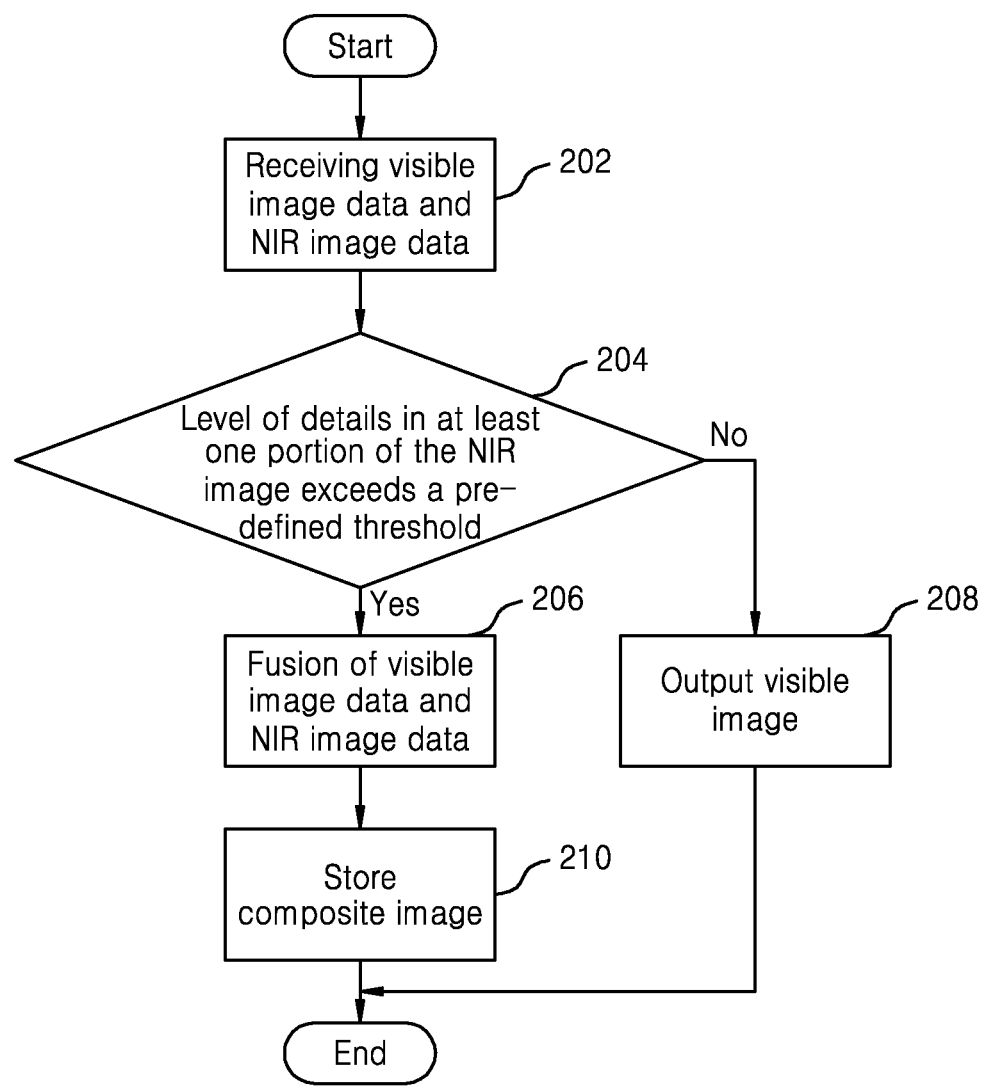
FIG. 2 is a flow diagram illustrating a method of producing a composite image according to an embodiment of the present disclosure.

FIG. 2 is a flow diagram illustrating a method of producing the composite image by the electronic device 100 according to an embodiment of the present disclosure.

Referring to FIG. 2, in operation 202, the electronic device 100 receives visible image data (e.g., RGB image data) and NIR image data. For example, the processor 104 of the electronic device 100 illustrated in FIG. 1 receives the RGB image data and the NIR image data. Once the processor 104 receives the RGB image data and the NIR image data, in operation 204, the electronic device 100 may determine whether any portions of the NIR image (e.g., any portions of data of the NIR image) have a level of detail greater than or equal to a threshold. For example, the processor 104 of the electronic device 100 illustrated in FIG. 1 may identify portions of the NIR image having a level of detail greater than or equal to the threshold.

If the processor 104 identifies a portion(s) of the NIR image having a level of detail greater than or equal to the threshold in operation 204, then, in operation 206, the electronic device 100 may generate the composite image by fusing the visible image data with the identified portion(s) of the NIR image data. For example, the processor 104 of the electronic device 100 illustrated in FIG. 1 generates a composite image (e.g., visible image data+NIR image data) by fusing visible image data (e.g., RGB image data) with the identified portion(s) of the NIR image data.

Once the processor 104 generates the composite image, the electronic device 100 may store the composite image in the memory 106 in operation 210. For example, the processor 104 of the electronic device 100 illustrated in FIG. 1 may store the composite image in the memory 106.

If the processor 104 does not identify a portion(s) of the NIR image having a level of detail greater than or equal to the threshold in operation 204, then, in operation 208, the electronic device 100 may output a visible image.

The various actions, acts, blocks, operations, etc., as illustrated in FIG. 2 may be performed in the order presented, in a different order, or simultaneously. Further, in some embodiments, some of the actions, acts, blocks, operations, etc., may be omitted, added, modified, skipped, etc., without departing from the scope of the disclosure.

Figure 3A:
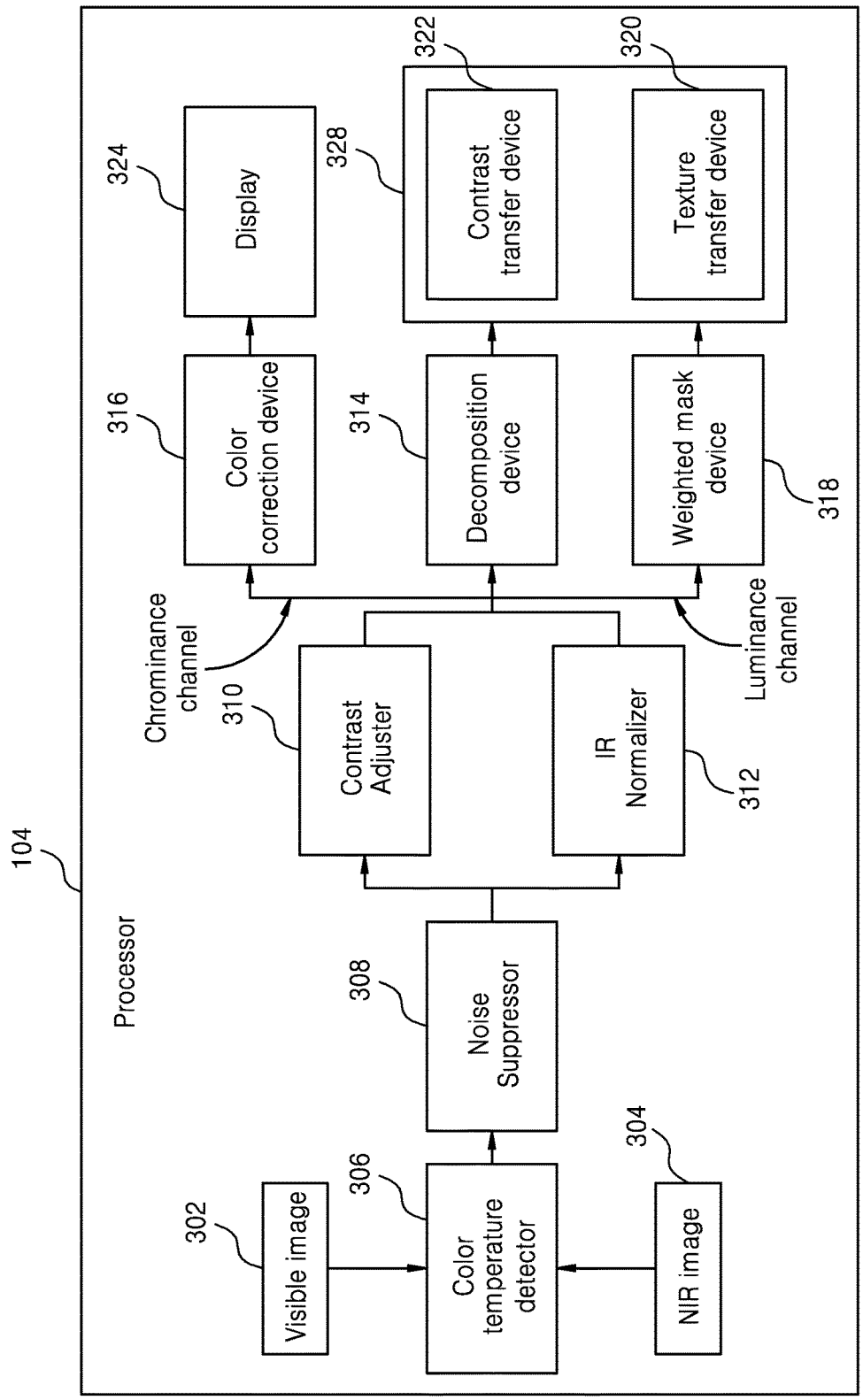
FIG. 3A is an overall architecture illustrating various units (e.g., components, elements, or devices) for producing a composite image according to an embodiment of the present disclosure.

FIG. 3A is an architecture illustrating various units (e.g., components, elements, or devices) for producing the composite image according to an embodiment of the present disclosure.

Referring to FIG. 3A, the processor 104 may differentiate between images obtained by the composite sensor 102, for example, between a visible image 302 and an NIR image 304. The processor 104 may obtain details of the NIR image 304 (e.g., identify the amount of noise in one or more portions of the NIR image 304) and may improve (e.g., increase) the intensities associated with the visible image 302 and the NIR image 304 (e.g., increase the brightness, contrast, color, etc. associated with one or more respective portions of the visible image 302 and the NIR image 304).

The processor 104 may transfer the details of the visible image 302 and the NIR image 304 to the color temperature detector 306. The color temperature detector 306 may transfer the visible image 302 and the NIR image 304, along with respective details thereof, to a noise suppressor 308.

The Color Temperature Detector 306:

The color temperature of a light source is the temperature of an ideal black-body radiator capable of emitting light comparable in hue to the light source. In practice, color temperature is only meaningful for light sources that may correspond, closely, to the light emitted by the black-body radiator. Low color temperature light refers to warmer light (e.g., a larger amount of yellow/red light), while high color temperature light refers to colder light (e.g., a larger amount of blue light). Daylight has a relatively low color temperature near dawn, and a higher one during the day. The color temperature detector 306 translates RGB values into tristimulus values (e.g., mixture of the three CIE primaries, X, Y, Z) and may obtain further correlated color temperature (CCT) using standard CCT formulae.

In the Gaussian approach of the related art using a bilateral filter for noise reduction in low light scenarios, preserving details of the visible image 302 and the NIR image 304 may result in a loss of details (e.g., noise information), which can affect image enhancement for low light conditions. Unlike the Gaussian approach of the related art using a bilateral filter, the noise suppressor 308 of the proposed mechanism provides for denoising (e.g., reducing noise) of the visible image 302 and the NIR image 304, which will be described in greater detail below.

Noise Suppressor 308:

The sharpness of the visible image 302 and the NIR image 304 is enhanced by modifying the range function of the bilateral filter according to the related art. The bilateral filter of the related art uses a Gaussian function in which the domain function is realized as:

$$v(i, j) = \exp\left(-\frac{i^2 + j^2}{2\sigma_D^2}\right) \quad \text{Equation 1}$$

and the range function is realized as:

$$w(x) = \exp\left(-\frac{x^2}{2\sigma_R^2}\right) \quad \text{Equation 2}$$

where i, j represents the spatial location of the image, x denotes the difference of the pixel values, $\sigma_D^2$ denotes the variance of the domain function, and $\sigma_R^2$ denotes the variance of the range function. The range function is modified by altering the variance of the Gaussian function as follows:

$$w(x) = \frac{1}{\sqrt{1 + \left|\frac{x}{\sigma_R^2}\right|^\mu}} \quad \text{Equation 3}$$

where x represents the difference of the pixel values and µ represents the amount of smoothening of the image.

The noise suppressor 308 may reduce noise from the visible image 302 (i.e., visual image) and output a corresponding denoised visible image. Further, the noise suppressor 308 may reduce noise from the NIR image 304 and output a corresponding denoised NIR image. For purposes of the description corresponding to FIG. 3A, the noise suppressor 308 outputs a denoised visible image and a denoised NIR image.

However, the embodiment is not limited thereto. The noise suppressor 308 may selectively apply noise filtering to the visible image 302 and the NIR image 304 and/or vary the amount of noise filtering applied thereto. For example, the noise suppressor 308 may directly output the visible image 302 and/or the NIR image 304 to the contrast adjuster 310 without applying noise filtering thereto (i.e., output the visible image 302, as opposed to outputting a corresponding denoised visible image, and output the NIR image 304, as opposed to outputting a corresponding denoised NIR image).

Contrast Adjuster 310:

The contrast adjuster 310 may enhance the denoised visible image to improve visibility thereof.

For example, visible images captured under low light conditions may suffer from deteriorated visual quality in overexposed and underexposed regions. The contrast adjuster 310 may increase the visual quality of such images (e.g., visible images, denoised visible images), thereby enhancing details (e.g., high frequency components, high texture components, contrast, amount of noise, etc.) thereof in both overexposed and underexposed regions while normalizing the same. The contrast adjuster 310 may perform any of the following (A-C) to improve the visibility (e.g., visual properties) of denoised visible images:

A) Gamma Correction:

Gamma correction is performed on the denoised visible image. However, gamma correction results in losing the natural appearance of the image and creates some unnatural artifacts.

B) Histogram Matching:

The probability distribution of the visible image 302 is estimated and the probability distribution of the NIR image 304 is adjusted to that of the visible image 302 by replacing pixel values in the corresponding bins.

C) Brightness Adjustment Using Black and White Points:

In this approach, the intensity of the NIR image 304 is adjusted to that of the luminance channel of the visible image 302 such that detail layers of the visible image 302 and the NIR image 304 are comparable. For example, the processor 104 may shift the mean of the luminance of the NIR image 304 towards the mean of the luminance of the visible image 302 and then normalize the shifted mean of the luminance to the range of visible image 302. Such an approach shows promising results as it deals with the normalization of the intensity values of the visible image 302 and the NIR image 304.

IR Normalizer 312:

The IR normalizer 312 may enhance denoised visible images output from the noise suppressor 308. Since visible images captured under low light conditions may suffer from low intensity levels, the IR normalizer 312 may enhance the same for better visual perception. For example, the IR normalizer 312 may obtain a denoised visible image and enhance the maximum value (I) of R, G, B channels using the following formulae:

$$D_s = \frac{1.3 * I(r, c)}{I_f(r, c) + 3 * \sigma_R} \qquad \text{Equation 4}$$

where I represents the input image, r, c represents the spatial location, $\sigma_R$ represents the variance of the range function, and $D_s$ represents the enhanced image. R, G, B channels of the denoised visible image are enhanced as below:

$$R(r,c)=R'(r,c)*D_s(r,c)/I(r,c) \qquad \text{Equation 5}$$

$$G(r,c)=G'(r,c)*D_s(r,c)/I(r,c) \qquad \text{Equation 6}$$

$$B(r,c)=B'(r,c)*D_s(r,c)/I(r,c) \qquad \text{Equation 7}$$

The IR normalizer 312 may match intensity levels of denoised NIR images to those of the denoised visible image having enhanced R, G, B channels (e.g., enhanced RGB image), thereby preventing mismatch in intensity levels from occurring during fusion. For example, the IR normalizer 312 may shift the mean of the histogram of a denoised NIR image to match that of the denoised RGB image and normalize the range of the pixels of the denoised NIR image to that of the denoised visible image.

Decomposition Device 314:

Most details of NIR images captured under low light scenarios will be preserved. Hence the base layer of visible image 302 and the detail layer of NIR image 304 are obtained from the bilateral filter of the related art as follows:

$$\text{Vis\_base}=bf(\text{Vis}) \qquad \text{Equation 8}$$

$$\text{NIR}_{base}=bf(\text{Nir}) \qquad \text{Equation 9}$$

$$\text{NIR\_detail}=\text{NIR}-\text{NIR\_base} \qquad \text{Equation 10}$$

where bf represents the bilateral filter of the related art.

The final enhanced image is obtained using the linear combination of the base layer of the visible image 302 and the detail layer of the NIR image 304 as follows:

$$I\_en=\text{Vis\_base}+\beta*\text{NIR\_detail} \qquad \text{Equation 11}$$

where $\beta$ controls the amount of contribution from the NIR detail layer, which plays a role in obtaining the desired output (e.g., final enhanced image) without any artifacts.

The transfer of the detail layer of a portion of the NIR image 304 data to the base layer of the visible image 302 includes transferring the level of detail of the portion of the NIR image 304 data (e.g., transferring the NIR detail of one or more portions of data of the NIR image 304) to a color correction device 316 and a weighted mask device 318 obtained from the saturation and luminance channels of the visible image 302.

Color Correction Device 316:

The color correction device 316 may utilize a color correction matrix for color correction operations such as adjusting white balance, color cast, brightness, or contrast in the visible image 302 (e.g., an RGB image). The standard color correction matrix computation methods can be used for improving color reproduction of fused RGB-IR images (e.g., composite image).

Weighted Mask Device 318:

A weight mask is created using cues obtainable from the visible image 302 and the NIR image 304. The cues include, for example, intensity of visible image 302, saturation of visible image 302, detail level in the visible image 302, and detail level in the NIR image 304. Further, the weighted mask device 318 may selectively fuse portions of the visible image 302 and the NIR image 304 to generate an enhanced visible image (e.g., to enhance the visible image 302). In another embodiment, the weight mask is created based on an analysis of contrast and texture (edges) of the visible image 302 and the NIR image 304, and the weighted mask device 318 may fuse the visible image 302 and the NIR image 304 based on this weight mask (e.g., based on an analysis and comparison of information content of the NIR image 304 and information content of the visible image 302).

Figure 3B:
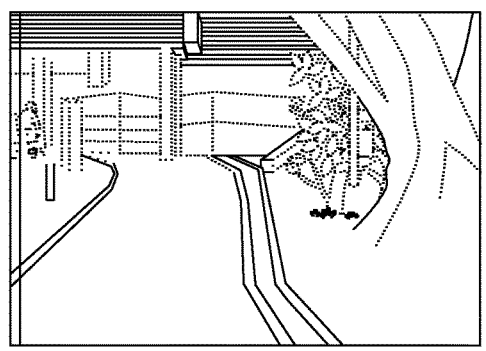
FIG. 3B illustrates an example of detecting the detail level of a near infrared (NIR) image according to an embodiment of the present disclosure.
Figure 3B:
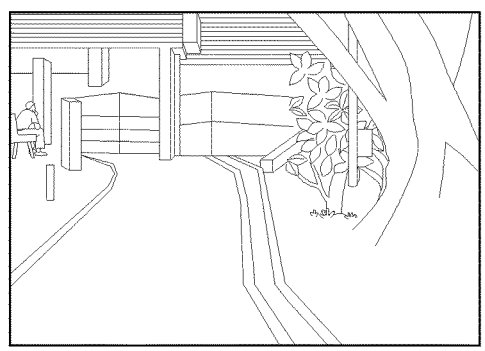
Figure 3B:
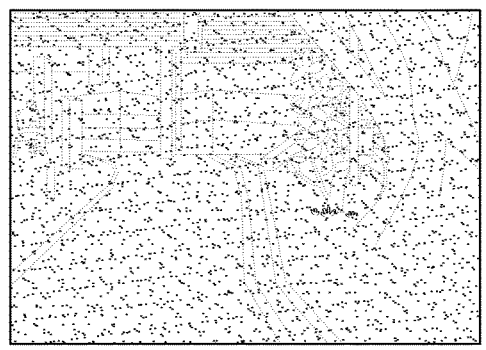
Figure 3B:

FIG. 3B illustrates an example of detecting the detail level of a NIR image according to an embodiment of the present disclosure.

Referring to FIG. 3B, an example in which the center region of the visible image 302 is an underexposed region and the NIR image 304 has better information (e.g., a higher level of detail) than the visible image 302 with respect to the center region is illustrated.

In such an example, the weighted mask device 318 may apply a weight mask having a high weight value in the center. The detail level of the NIR image 304 is the high frequency component (edges or texture) present in the NIR image 304, as shown in FIG. 3B. Thus, the processor 104 may control the fusion of the visible image 302 and the NIR image 304 based on measured edge strength and texture analysis, such that a portion of the NIR image 304 corresponding to the underexposed region (i.e., the center region of the visible image 302) is fused with the visible image 302.

Further, the weighted mask device 318 may apply a weight mask having high weight values in different regions/areas according to an embodiment. For example, if the center region and a top right corner region of the visible image 302 are underexposed regions, and the NIR image 304 has better information (e.g., a higher level of detail) than the visible image 302 with respect to the center region and the top right corner region, the weighted mask device 318 may apply a weight mask having high weight values in the center region and the top right corner region. The processor 104 may control the fusion of the visible image 302 and the NIR image 304 such that portions of the NIR image 304 corresponding to the underexposed regions (i.e., the center region and the top right corner region of the visible image 302) are fused with the visible image 302.

Texture Transfer Device 320:

The texture transfer device 320 may selectively transfer details from the NIR image 304 to the visible image 302 according to the weighted mask. For example, the texture transfer device 320 may fuse the detail layer of NIR image 304 with the base layer of the visible image 302 based on the weighted mask.

Contrast Transfer Device 322:

Intensity mismatch between images may lead to the occurrence of unnatural artifacts during fusion. Hence, to reduce intensity mismatch and the occurrence of such unnatural artifacts, the contrast transfer device 322 may apply histogram matching techniques to match the intensity level of the NIR image 304 to that of the visible image 302. For example, the contrast transfer device 322 may apply histogram matching techniques to match the normalized visible image (e.g., the denoised visible image following normalization by the IR normalizer 312) and the normalized NIR image (e.g., the denoised NIR image following normalization by the IR normalizer 312).

Display 324:

The display 324 (similar to the display 108) may display the enhanced image (i.e., composite image) to the user.

Figure 8:
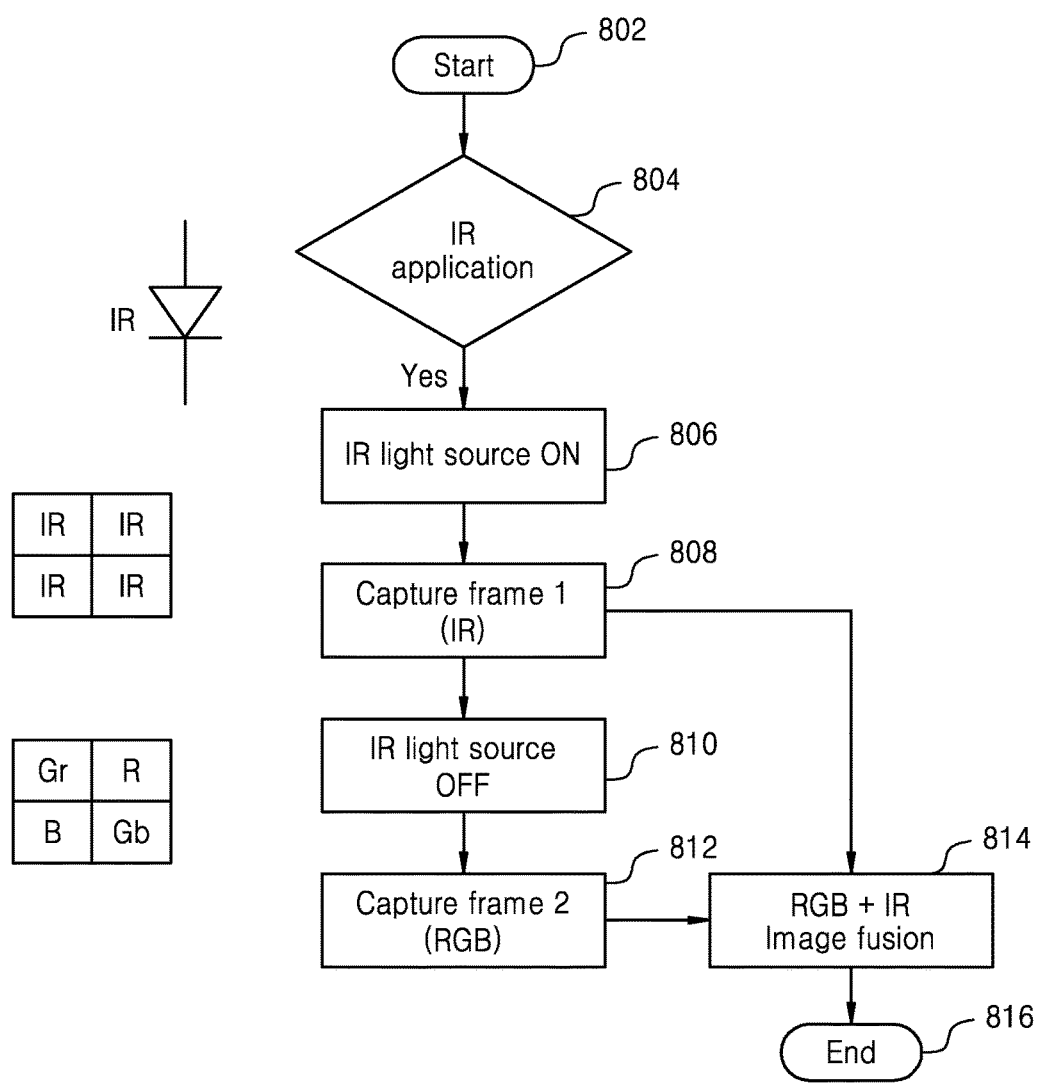
FIG. 8 is a flow diagram illustrating a method of producing a composite image based on the presence of an infrared (IR) light source according to an embodiment of the present disclosure.

Unlike the mechanism of the related art, the processor 104 can be configured to intelligently perform fusion of visible image data with one or more portions of the NIR image data to obtain an enhanced output image based on the presence of an IR light source, which will be disclosed described in greater detail with respect to FIG. 8.

Figure 4:
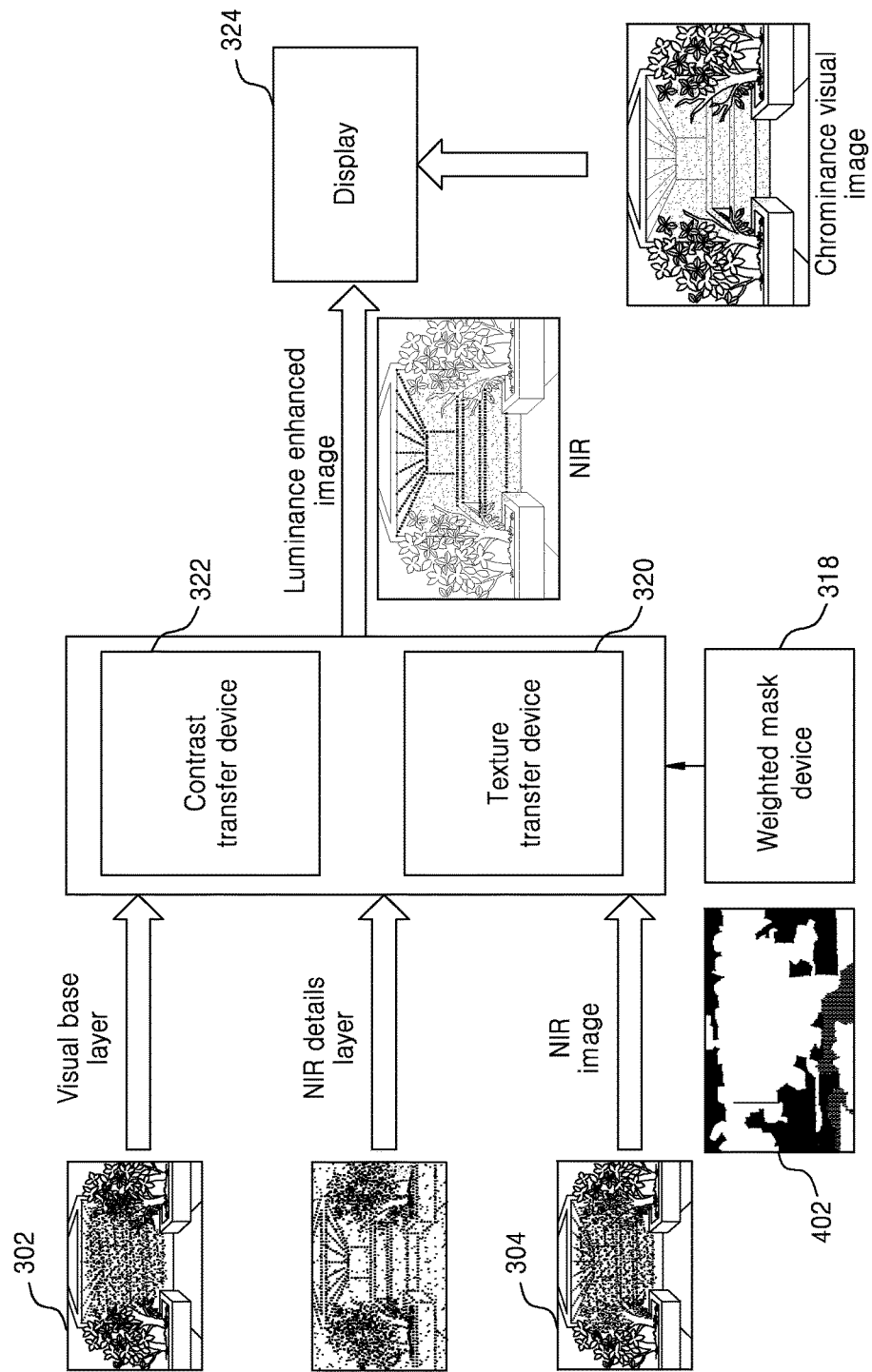
FIG. 4 illustrates an example scenario of a method of producing a composite image with low light enhancement according to an embodiment of the present disclosure.

In conjunction with FIGS. 3A and 3B, an example scenario illustrating a method of producing the composite image with low light enhancement is disclosed in FIG. 4.

FIG. 4 illustrates an example scenario of a method of producing a composite image with low light enhancement according to an embodiment of the present disclosure.

Referring to FIG. 4, the texture transfer device 320 can be configured to select details (e.g., texture) to be transferred from the NIR image 304 to the visible image 302, and the contrast transfer device 322 can be configured to match the intensity level of the NIR image 304 to that of the visible image 302. Further, the weighted mask device 318 can be configured to create a weight mask 402 based on the analysis of contrast and texture (edges) of the visible image 302 and the NIR image 304. The processor 104 can perform the fusion based on the weight mask, which will be described in greater detail in conjunction with FIG. 7.

Figure 5A:
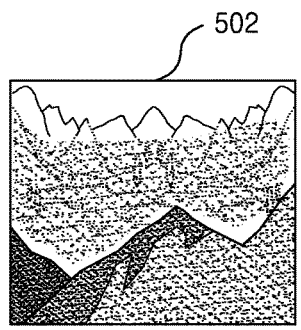
FIGS. 5A, 5B, and 5C illustrates example scenarios of generating a composite image in hazy weather conditions according to various embodiments of the present disclosure.
Figure 5B:
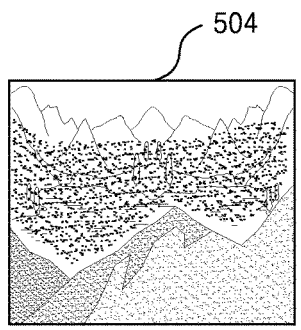
Figure 5C:
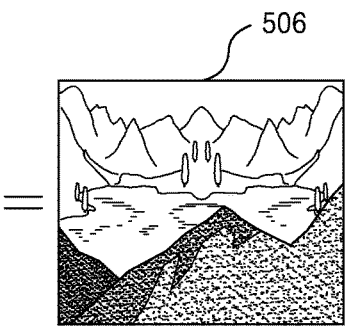

FIGS. 5A, 5B, and 5C illustrate example scenarios in which the electronic device 100 generates a composite image in response to detecting a weather event (e.g., identifying weather conditions present in a captured image(s), identifying weather conditions present when capturing an image(s)) according to various embodiments of the present disclosure.

The processor 104 may detect for contextual events in the visible image 502 and the NIR image 504. For example, the processor 104 may detect for a weather event such as hazy weather conditions. Further, upon detecting a contextual event (e.g., weather event), the processor 104 may identify a portion(s) of the NIR image 504 having a level of detail greater than or equal to a threshold and generate a composite image 506 (e.g., visible image 502 data+NIR image 504 data) having a wavelength outside of visible wavelength, by fusing the visible image 502 data with the identified portion(s) of the NIR image 504 data.

Figure 6A:
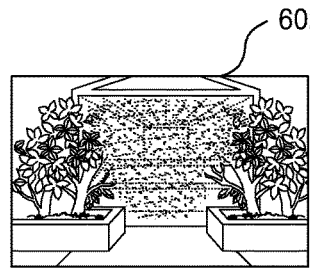
FIGS. 6A, 6B, and 6C illustrates example scenarios of generating a composite image having improved range according to various embodiments of the present disclosure.
Figure 6B:
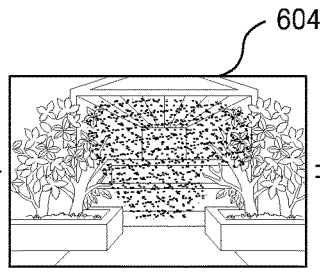
Figure 6C:
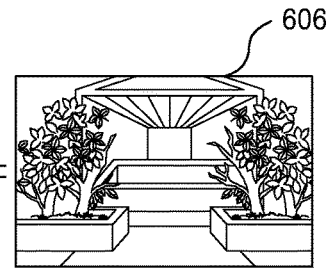

FIGS. 6A, 6B, and 6C illustrates example scenarios in which the electronic device 100 generates a composite image having improved range according to various embodiments of the present disclosure.

The processor 104 may identify a portion(s) of an NIR image 604 having a higher level of detail (e.g., contrast) than a visible image 602. The processor 104 can be configured to generate a composite image 606 (e.g., visible image 602 data+NIR image 604 data) having improved range, by fusing the visible image 602 data with the identified portion(s) of the NIR image 604 data.

Figure 7:
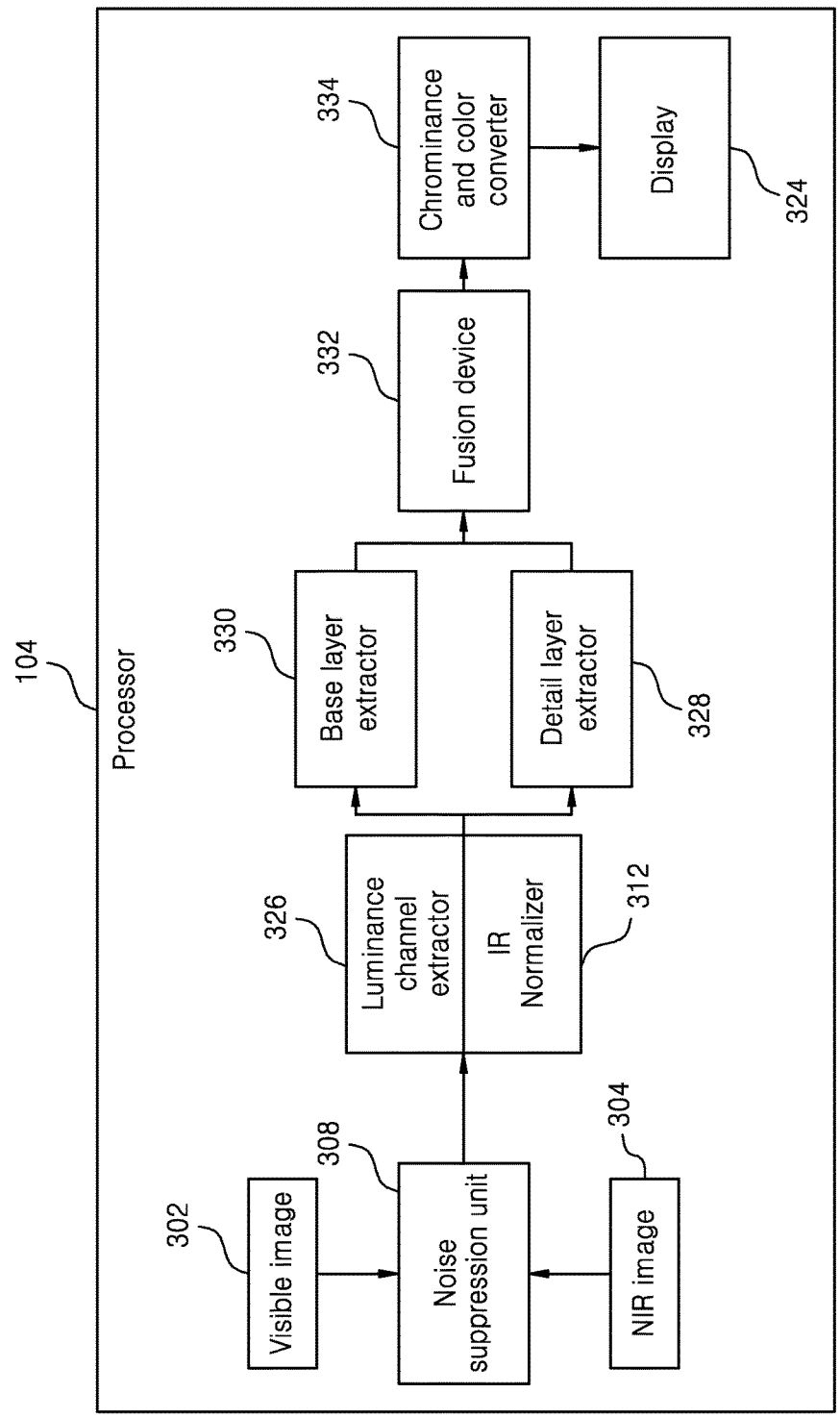
FIG. 7 is an architecture illustrating various units (e.g., components, elements, or devices) for producing a composite image with realistic skin smoothing according to an embodiment of the present disclosure.

FIG. 7 is an architecture illustrating various units (e.g., components, elements, or devices) for producing a composite image with realistic skin smoothing according to an embodiment of the present disclosure.

Referring to FIG. 7, in conjunction with FIGS. 3A and 3B, the processor 104 may differentiate between images obtained by the composite sensor 102, for example, between a visible image 302 and an NIR image 304. The processor 104 may obtain details of the NIR image 304 (e.g., identify the amount of noise in one or more portions of the NIR image 304) and may improve (e.g., increase) the intensities associated with the visible image 302 and the NIR image 304 (e.g., increase the brightness, contrast, color, etc. associated with one or more respective portions of the visible image 302 and the NIR image 304).

The processor 104 may transfer the details of the visible image 302 and the NIR image 304 to the noise suppressor 308. The operations of the noise suppressor 308 are described above in reference to FIGS. 3A and 3B.

Luminance Channel Extractor 326:

The luminance channel extractor 326 can be configured to extract intensity (e.g., calculate brightness) from the NIR image 304 (e.g., from a portion of the NIR image 304) and adjust the intensity to that of the luminance channel of the visible image 302 such that detail layers of the visible image 302 and the NIR image 304 are comparable with respect to intensity. For example, the processor 104 may shift the mean of the luminance of the NIR image 304 towards the mean of the luminance of the visible image 302 and then renormalize the shifted mean of the luminance to the range of visible image 302.

The operations of the IR Normalizer 312 and the display 324 are described above in reference to FIGS. 3A and 3B.

Detail Layer Extractor 328:

The detail layer extractor 328 includes the texture transfer device 320 and the contrast transfer device 322. The operations of each of the texture transfer device 320 and the contrast transfer device 322 are described above in reference to FIG. 3A.

Base Layer Extractor 330:

the base layer extractor 330 can be configured to decompose a portion(s) of the NIR image 304 and the visible image 302 to a base layer (e.g., low frequency). The base layer extractor 330 may include the decomposition device 314 (as described above in reference to FIGS. 3A and 3B), and the decomposition device 314 may perform the above described decomposition operations.

Fusion Device 332:

The fusion device 332 can be configured to fuse portions of the visible image 302 and the NIR image 304.

Chrominance and Color Converter 334:

The chrominance and color converter 334 can be configured to adjust white balance, color cast, brightness, or contrast in the visible image 302 (e.g., an RGB image). The standard color correction matrix computation methods can be used for improving color reproduction of fused RGB-IR images (e.g., composite image).

FIG. 8 is flow diagram illustrating a method of producing the composite image based on the presence of an IR light source according to an embodiment of the present disclosure.

Referring to FIG. 8, in operation 802, the electronic device 100 initiates the process of combining visible image data (e.g., RGB image data) and IR image data (e.g., NIR image data).

For example, in operation 802, the processor 104 of the electronic device 100 illustrated in FIG. 1 may initiate the process of combining the visible image data and the IR image data.

In operation 804, the IR application of the electronic device 100 detects whether the IR light source is in ON state. For example, in operation 804, the processor 104 of the electronic device 100 illustrated in FIG. 1 may detect, by way of the IR application, whether the IR light source is in ON state.

In operation 806, if the electronic device 100 detects the presence of the IR light source (i.e., detects that the IR light source is ON), then in operation 808, the electronic device 100 captures a first frame type (e.g., an IR image frame).

In operation 810, if the electronic device 100 detects that the IR light source is in an OFF state, then in operation 812, the electronic device 100 captures a second frame type (e.g., a visible image frame or RGB image frame).

In operation 814, the electronic device 100 detects whether a portion(s) of the IR image (e.g., portion(s) of data in the IR image) has a level of detail greater than or equal to a threshold. The value of the threshold may be pre-determined. When the electronic device 100 detects that a portion(s) of the IR image (e.g., a portion(s) of data of the IR image) has a level of detail greater than or equal to a threshold, the electronic device 100 performs the fusion of the IR image and the visible image. When the electronic device 100 detects that no portion of the IR image (e.g., no portion of data in the IR image) has a level of detail greater than or equal to the threshold, the electronic device 100 may output the visible image frame, without fusing the IR image frame and the visible image frame.

In operation 816, the electronic device 100 terminates the fusion process.

The various actions, acts, blocks, operations, etc., as illustrated in FIG. 8 may be performed in the order presented, in a different order, or simultaneously. Further, in some embodiments, some of the actions, acts, blocks, operations, etc., may be omitted, added, modified, skipped, etc., without departing from the scope of the disclosure.

Figure 9A:
FIGS. 9A and 9B illustrate example scenarios in which a processor generates a composite image having an improved level of skin smoothing according to various embodiments of the present disclosure.
Figure 9A:
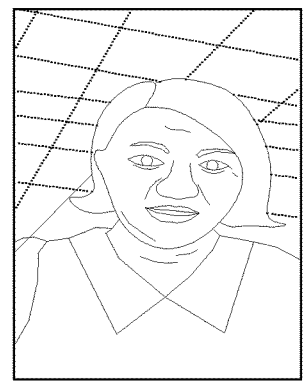
Figure 9A:
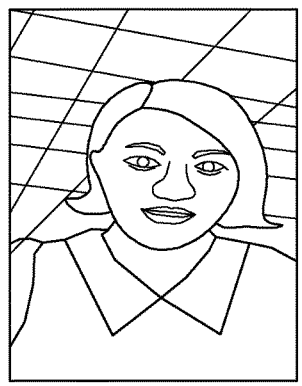
Figure 9B:
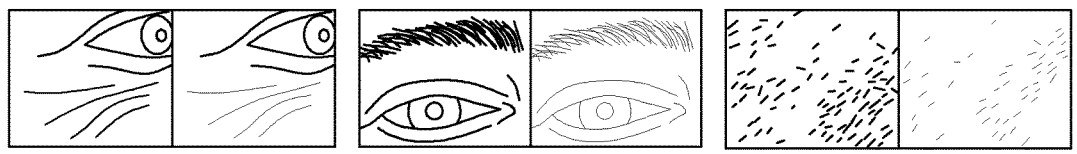

FIGS. 9A and 9B illustrate example scenarios in which the processor 104 generates a composite image having an improved level of skin smoothing, according to various embodiments of the present disclosure.

Under the presence of an IR light source, it is useful to combine visible (e.g., RGB) and NIR images. Combining improves quality of images captured in portrait mode (e.g., skin smoothing of portrait photos) and a larger amount of detail is captured (e.g., higher visibility) under low light conditions.

The two main areas of interest for imaging are the epidermis and the dermis. The epidermis, also called "melanin layer", is responsible for most of the pigmented coloration of the skin. It is the melanin concentration that gives the skin a color that can vary from pale to dark brown. The epidermis layer is otherwise fairly thin and no significant scattering occurs. Just underneath the epidermis lies the dermis layer. In the dermis layer, significant scattering occurs, as well as hemoglobin absorption (giving the skin its reddish shade). The building block for skin smoothing is the same as for low light enhancement. Referring back to FIG. 7, the processor 104 may decompose an NIR image and a visible image into base layers (low frequency/homogeneous region) and detail layers (texture/high frequency/fine edges). The fusion device 332 may fuse portions of the visible image and the NIR image (e.g., fuse the detail layer of the NIR image with the base layer of visible images), based on a threshold.

FIG. 9B illustrates three sets of visible images and NIR images. The NIR images (shown on the right of each set) do not include or show fine edges (wrinkles) as IR penetrates well below the skin region Since the base layer of the visible images will have low frequencies (e.g., no fine edges), the base layer of visible images are free from fine edges (wrinkles and other skin artifacts). Further, due to skin penetration properties of IR, NIR images are also free from fine edges (wrinkles and other skin artifacts). The fusion performed by the processor 104 results in composite images in which skin regions are smoothened.

Figure 10:
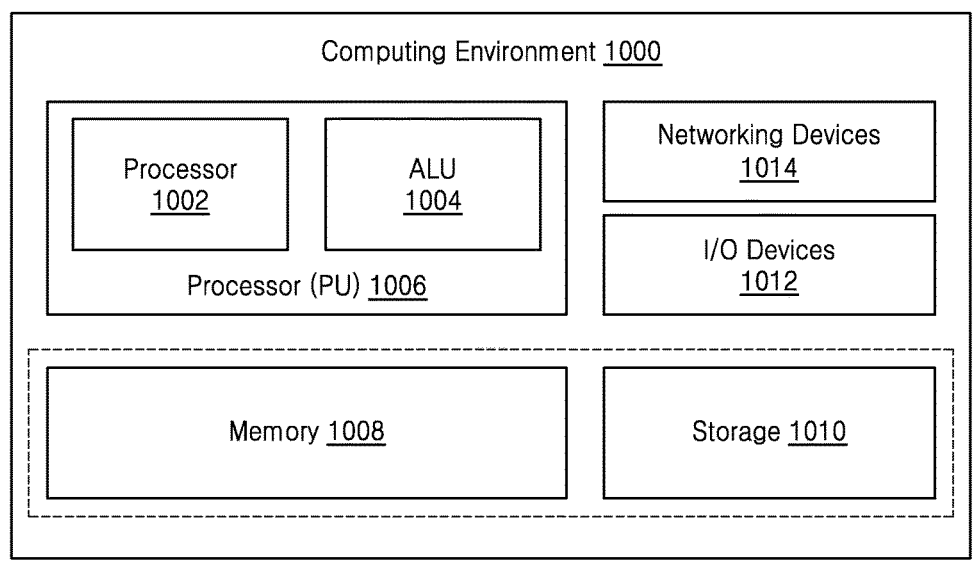
FIG. 10 illustrates a computing environment implementing for a method of producing a composite image by an electronic device according to an embodiment of the present disclosure.

FIG. 10 illustrates a computing environment implementing the method of managing the operations of the applications in the electronic device 100 according to an embodiment of the present disclosure.

Referring to FIG. 10, the computing environment 1000 comprises at least one processor 1006 equipped with a processor 1002 and an arithmetic logic unit (ALU) 1004, a memory 1008, storage 1010, networking devices 1014 and input/output (I/O) devices 1012. The processor 1006 is responsible for processing the instructions of the technique. The processor 1006 may process the instructions based on commands the processor 1006 receives from the processor 1002. Further, any logical and arithmetic operations involved in the execution of the instructions may be computed by or with the help of the ALU 1004.

The overall computing environment 1000 can be composed of multiple homogeneous and/or heterogeneous cores, multiple CPUs of different kinds, special media and other accelerators. The processor 1006 is responsible for processing the instructions of the technique. Further, the processor 1006 may be implemented as multiple processors located on a single chip or multiple chips.

The technique comprising of instructions and codes required for the implementation are stored in either the memory 1008, the storage 1010, or both. At the time of execution, the instructions may be fetched from the memory 1008 or storage 1010, and executed by the processor 1006.

In the case of any hardware implementations, various networking devices 1014 or external I/O devices 1012 may be connected to the computing environment to support the implementation.

The various embodiments disclosed herein can be implemented through at least one software program running on at least one hardware device and performing network management functions to control the elements. The elements shown in FIGS. 1, 2, 3A and 3B, 4, 5A to 5C, 6A to 6C, 7, 8, 9A and 9B, and 10 include blocks which can be at least one of a hardware device, or a combination of hardware device and software module.

While the present disclosure has been shown and described with reference to the various embodiments thereof, it will be understood by those skilled in the art that various changes in form and details may be made therein without departing from the spirit and scope of the present disclosure as defined by the appended claims and their equivalents.

What is claimed is:

1. A method of producing a composite image by an electronic device, the method comprising:
    receiving, by the electronic device, visible image data and near infrared (NIR) image data from a composite sensor;
    determining, by the electronic device, whether at least one portion of the NIR image data has a level of detail greater than or equal to a threshold, the level of detail comprising at least one of high frequency components of the NIR image data or brightness of the at least one portion of the NIR image data;
    generating, by the electronic device, the composite image with the visible image data based on the determining; and
    storing, by the electronic device, the composite image in a memory.

2. The method of claim 1, wherein the generating of the composite image further comprises generating the composite image by fusing the visible image data with the at least one portion of the NIR image data based on the determining of the at least one portion of the NIR image data having the level of detail greater than or equal to the threshold.

3. The method of claim 1, wherein the level of detail further comprises at least one of:
    noise reduction of the NIR image data,
    contrast adjustment of the visible image data,
    normalization of the visible image data,
    normalization of the NIR image data,
    high texture components of the NIR image, and
    decomposition of the visible image, or
    decomposition of the NIR image.

4. The method of claim 2, wherein the fusing of the visible image data with the at least one portion of the NIR image data comprises:
    detecting a contextual event,
    identifying the at least one portion of the NIR image data based on the contextual event, and
    transferring a detail layer of the at least one portion of the NIR image to a base layer of the visible image.

5. The method of claim 4, wherein the contextual event is one of a lighting condition or a weather condition.

6. The method of claim 4, wherein the transferring of the detail layer comprises transferring, to the base layer of the visible image, the level of detail of the at least one portion of the NIR image data based on a weight mask obtained using cues from the visible image data and the NIR image data.

7. The method of claim 6, wherein the transferring of the level of detail comprises transferring one of contrast detail or texture detail of the at least one portion of the NIR image data.

8. The method of claim 6, wherein the fusing of the visible image data with the at least one portion of the NIR image data comprises:
    selecting an amount of the at least one portion of the NIR image data to fuse with the visible image, based on the level of detail of the at least one portion of the NIR image data, and
    fusing the visible image data with the at least one portion of the NIR image data, based on the selected amount.

9. The method of claim 1, wherein the composite image comprises at least one of:
    an improved level of realistic skin smoothing compared to the visible image,
    an improved level of range compared to the visible image,
    an improved level of visibility compared to the visible image, or
    an improved level of rich information outside a visible wavelength compared to the visible image.

10. An electronic device for producing a composite image, the electronic device comprising:
    a composite sensor configured to capture a visible image and near infrared (NIR) image; and
    at least one processor configured to:
        receive visible image data associated with the visible image and NIR image data associated with the NIR image from the composite sensor,
        determine whether at least one portion of the NIR image data has a level of detail greater than or equal to a threshold, the level of detail comprising at least one of high frequency components of the NIR image data or brightness of the at least one portion of the NIR image data,
        generate the composite image with the visible image data based on the determining, and
        store the composite image in a memory coupled to the at least one processor.

11. The electronic device of claim 10, wherein the level of detail further comprises at least one of:
    noise reduction of the NIR image data,
    contrast adjustment of the visible image data,
    normalization of the visible image data,
    normalization of the NIR image data,
    high texture components of the NIR image,
    decomposition of the visible image, or
    decomposition of the NIR image.

12. The electronic device of claim 10, wherein in the generating of the composite image with the visible image, the at least one processor is configured to generate the composite image by fusing the visible image data with the at least one portion of the NIR image data based on the determining of the at least one portion of the NIR image data having the level of detail greater than or equal to the threshold.

13. The electronic device of claim 12, wherein in fusing the visible image data with the at least one portion of the NIR image data, the at least one processor is configured to:
    detect a contextual event,
    identify the at least one portion of the NIR image data based on the contextual event, and
    transfer a detail layer of the at least one portion of the NIR image to a base layer of the visible image.

14. The electronic device of claim 13, wherein the contextual event is one of a lighting condition or a weather condition.

15. The electronic device of claim 13, wherein in transferring the detail layer of the at least one portion of the NIR image data, the at least one processor is configured to:

transfer, to the base layer of the visible image, the level of the detail of the at least one portion of the NIR image data based on a weight mask obtained using cues from the visible image data and the NIR image data.

16. The electronic device of claim 15, wherein in transferring the level of detail, the at least one processor is configured to transfer one of contrast detail or texture detail of the at least one portion of the NIR image data.

17. The electronic device of claim 15, wherein in fusing of the visible image data with the at least one portion of the NIR image data, the at least one processor is configured to:
  select an amount of the at least one portion of the NIR image data to fuse with the visible image, based on the level of detail of the at least one portion of the NIR image data, and
  fuse the visible image data with the at least one portion of the NIR image data, based on the selected amount.

18. The electronic device of claim 10, wherein the composite image comprises at least one of:
  an improved level of realistic skin smoothing compared to the visible image,
  an improved level of range compared to the visible image,
  an improved level of visibility compared to the visible image, or
  an improved level of rich information outside a visible wavelength when compared to the visible image.

19. The electronic device of claim 10, the at least one processor is further configured to improve an intensity associated with at least one of visible image of the visible image data or NIR image of the NIR image data.

20. A non-transitory computer readable recording medium having recorded thereon a program for executing a method of producing a composite image by an electronic device, the method comprising:
  receiving visible image data and near infrared (NIR) image data from a composite sensor;
  determining whether at least one portion of the NIR image data having a level of detail greater than or equal to a threshold, the level of detail comprising at least one of high frequency components of the NIR image data or brightness of the at least one portion of the NIR image data;
  generating the composite image with the visible image data based on the determining; and
  storing, by the electronic device, the composite image in a memory.

* * * * *